United States Patent [19]
von Wiesenthal

[11] 3,965,885
[45] June 29, 1976

[54] HEATER FOR LARGE FLOWS AT LOW PRESSURE LOSSES

[75] Inventor: Peter von Wiesenthal, New York, N.Y.

[73] Assignee: Heat Research Corporation, New York, N.Y.

[22] Filed: Feb. 24, 1975

[21] Appl. No.: 552,109

Related U.S. Application Data

[63] Continuation-in-part of Ser. No. 462,046, April 18, 1974, abandoned.

[52] U.S. Cl............................. 126/110 R; 165/83; 126/110 AA
[51] Int. Cl.²........................................... F24H 3/02
[58] Field of Search............ 126/99 R, 99 C, 110 R, 126/99 D, 110 AA, 106, 110 B; 165/83

[56] References Cited
UNITED STATES PATENTS

| | | | |
|---|---|---|---|
| 1,558,848 | 10/1925 | Doble, Jr. | 126/110 R |
| 1,932,610 | 10/1933 | Tilley | 165/83 |
| 2,468,903 | 5/1949 | Villiger | 165/83 |
| 2,472,497 | 6/1949 | Stookey | 432/209 |
| 2,704,062 | 3/1955 | Beyerman | 126/110 R |
| 2,828,946 | 4/1958 | Smith | 165/83 |
| 2,893,374 | 7/1959 | Wilson, Sr. | 126/110 R |
| 3,171,400 | 3/1965 | Heiman | 126/110 R |
| 3,183,967 | 5/1965 | Mettenleiter et al. | 165/83 |
| 3,189,086 | 6/1965 | Esser et al. | 165/83 |
| 3,312,212 | 4/1967 | Wilson | 126/110 R |
| 3,439,666 | 4/1969 | Schuch | 126/110 R |
| 3,547,202 | 12/1970 | Ticknor | 165/83 |
| 3,794,014 | 2/1974 | McVickar et al. | 126/110 R |

FOREIGN PATENTS OR APPLICATIONS

| | | | |
|---|---|---|---|
| 13,183 | 12/1924 | Netherlands | 126/110 R |

*Primary Examiner*—John J. Camby
*Assistant Examiner*—Henry C. Yuen
*Attorney, Agent, or Firm*—Charles E. Baxley

[57] ABSTRACT

This disclosure teaches a heater which is especially well suited to handling large flows of a process stream at low pressure losses. A cylindrical sleeve, having a first end and a second end, is mounted by means of a bellows in a cylindrical shell having a first end and a second end each corresponding with that of the sleeve. The first ends converge to form a convection input passage therebetween, the second ends diverge to form a radiant zone therebetween. Hot gas passes between the shell and the sleeve through the radiant zone and then the convection input zone, the process stream passes through the inner flow space. A baffle is mounted within the sleeve in its first end to channel the process stream into a convection output passage boardered inwardly by the baffle and outwardly by the sleeve. Extended surface projects from the sleeve into the convection input zone and additional extended surface projects from the sleeve into the convection output passage.

1 Claim, 4 Drawing Figures 3,965,885

HEATER FOR LARGE FLOWS AT LOW PRESSURE LOSSES

CROSS REFERENCE

This a continuation-in-part application with respect to my copending application 462,046 filed Apr. 18, 1974, now abandoned.

BACKGROUND OF INVENTION

There are numerous situations wherein it is necessary to heat large flows of a process stream and wherein low pressure losses are mandated. Cases in point are air preheaters, particularly those employed in incineration systems. Such heating of large flows at low pressure losses has been difficult to achieve by prior art installations in terms of capital costs, thermal efficiency and the like.

BRIEF STATEMENT OF INVENTION

The present disclosure solves problems of prior art installations in a particularly useful, novel, unobvious and facile way. A heater is fabricated having a cylindrical sleeve, with a first end and a second end, mounted in a cylindrical shell. The shell has a first end and a second end each corresponding with that of the sleeve. The first ends converge to form a convection input passage therebetween, the second ends diverge to form a radiant zone therebetween. Hot gas passes between the shell and the sleeve through the radiant zone and then the convection input zone, while the process stream passes through an inner flow space disposed inward of the sleeve. A baffle is mounted within the sleeve in its first end to channel the process stream into a convection output passage boardered inwardly by the baffle and outwardly by the sleeve. Extended surface projects from the sleeve into the convection input zone and additional extended surface projects from the sleeve into the convection output passage.

Accordingly one object of this invention is to heat large flows at low pressure drops.

Another object of this invention is to improve thermal efficiency.

Still another object of this invention is to fabricate a heater of the type here contemplated and employing inexpensive materials.

Still another object of this invention is to fabricate a heater of the type here contemplated which accommodates either conventional burners or an external source as a means to provide the hot gas.

Still another object of the invention is to fabricate a heater of the type here contemplated which can operate either cocurrently or countercurrently.

Still another object of this invention is to fabricate a heater of the type here contemplated wherein allowance can be made conveniently for differential thermal expansion of parts of the heater.

Still another object of this invention is to fabricate a heater of the type here contemplated which is particularly well adapted to incineration systems wherein the process stream is combustion air and the hot gas is derived from the material being incinerated. Fuel requirements needed to achieve incineration temperatures are reduced drastically thereby.

Still another object of this invention is to provide a heater of the type here contemplated wherein the hot gas space is operable at a superatmospheric pressure so that structural requirements of the sleeve can be reduced.

Still another object of this invention is to fabricate a heater of the type here contemplated which is simple to design, build and maintain.

Still another object of this invention is to fabricate a heater of the type here contemplated which is suited well otherwise to its intended functions.

DESCRIPTION OF DRAWINGS

The foregoing and other objects, features and advantages will appear more fully from detailed descriptions of preferred embodiments of the invention which follow along with claims which also follow, all viewed in conjunction with accompanying drawings wherein:

FIG. 4 is an enlarged detail view partly in section showing fins of FIG. 2.

DESCRIPTION OF PREFERRED EMBODIMENTS

Figure 1:
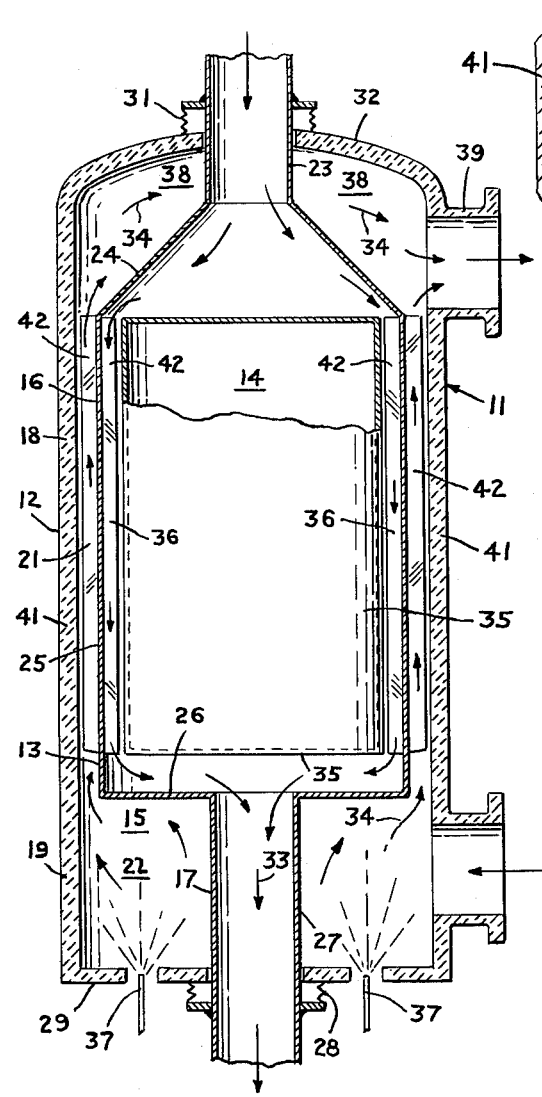
FIG. 1 is a vertical view in section of a heater according to this invention with longitudinal fins mounted on the sleeve to serve as the extended surface.

As seen in FIG. 1 a heater generally designated 11 includes a vertical cylindrical shell 12 supported by a suitable structural system. A sleeve 13 is mounted in the shell 12 to separate a cylindrical inner flow space 14 from an annular outer flow space 15. The sleeve 13 has a first end 16 and a second end 17 each of which corresponds with a first end 18 and a second end 19 respectively of the shell 12. The first ends 16, 18 converge to form a convection input passage 21 therebetween, while the second ends 17, 19 diverge to form a radiant zone 22 therebetween. To effect the foregoing, the sleeve 13 includes a duct 23 which penetrates into the shell 12 and is connected in sealed engagement with a hood 24, which in turn is connected in sealed engagement with a cylindrical portion 25, which in turn is connected in sealed engagement with a disk like partition section 26, which in turn is connected in sealed engagement with another duct portion 27 which also penetrates the shell 12. The sleeve 13 can be supported at its top, in which case differential thermal expansion between the sleeve 13 and the shell 12 can be taken care of by providing a bellows 28 between the duct 27 and the bottom 29 of the shell 12. Alternately the sleeve 13 can be supported anywhere along its length with expansion being accommodated partially in each direction, in which case another bellows 31 could be provided between a top 32 of the shell 12 and the duct 23.

According to this invention the process stream 33 is passed through the inner flow space 14. Flow of the process stream 33 is shown here to be downward in countercurrent heat exchange relationship with upward flow of the hot gas 34, but it is sometimes desirable to flow the process stream 33 cocurrently with the hot gas 34 and this cocurrent flow also can be accomplished by means of the heater 11 of this invention as will be understood by those skilled in heater design. The process stream is shown to enter via the duct 23, and the hood 24 and to be diverted by a baffle 35 disposed in the first end 16 of the sleeve 13 to conduct the process stream 33 into an annular convection output passage 36 which is boardered inwardly by the baffle 35 and outwardly by the sleeve 13. From the convection output passage 36 the process stream 33 passes through the duct 27 to exit the sleeve 13.

The hot gas 34 may be provided by burning a fuel in the radiant zone 22 of the outer flow space 15 using one or more burners 37 (which penetrate the bottom 29 of the shell 12) or some other source of the hot gas 34 may be employed. Usually the hot gas 34 will give up some of its heat by means of radiant transfer in the radiant zone 22. The size of the radiant zone 22 is a function of the temperature and constitution of the hot gas 34 and/or the combustion space required. At very low radiant temperatures or low heat input rates, the radiant zone 22 required could be practically nil, in which case the heater 11 would operate on substantially convection principles.

From the radiant zone 22 the hot gas 34 passes through the convection input passage 21 boardered inwardly by the first end 16 of the sleeve 13 and outwardly by the first end 18 of the shell 12. From the convection input passage 21 the hot gas 34 is collected in a plenum 38 boardered by the hood 24 and the top 32 of the shell 12 whence the hot gas 34 exits via a line 39.

The shell 12 is lined with an insulating refractory 41 to reduce heat losses to the surroundings. This refractory 41 can be applied internally (as shown) or externally of the shell 12, depending upon circumstances. If the refractory 41 is applied externally of the shell 12, the shell 12 will run hotter, thus reducing temperature differential between the shell 12 and the sleeve 13.

It is important to extract heat from the hot gas 34 by means of convective heat transfer as well as by radiant heat transfer. Toward this objective the disk like partition 26 channels the hot gas 34 into the convection input passage 21 which is boardered between the sleeve 13 and the shell 12 and is in flow series with the plenum 38.

Figure 2:
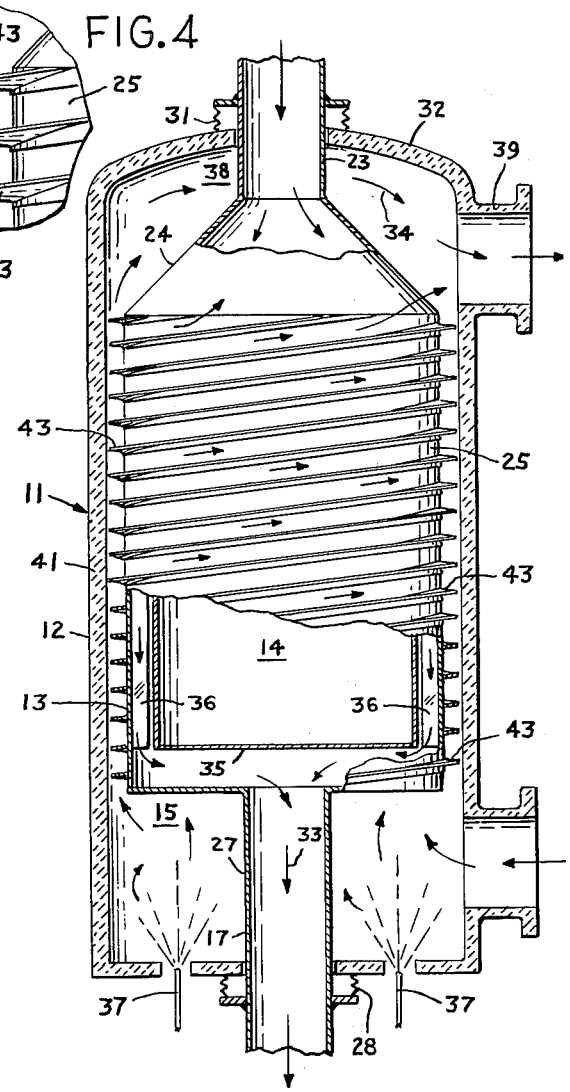
FIG. 2 is a vertical view in section of another embodiment of the heater according to the present invention with fins wound spirally on the sleeve to serve as the extended surface.
Figure 3:
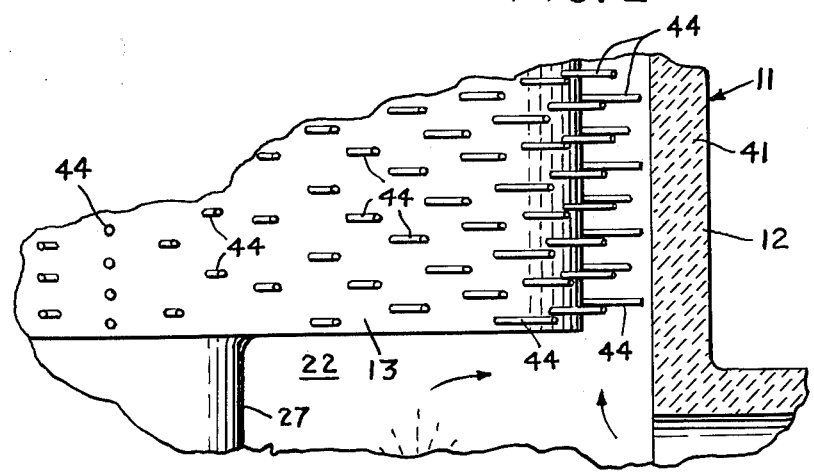
FIG. 3 is a broken sectional view of a portion of the sleeve with studs serving as the extended surface.

Extended surface used in this heater may be in the form of longitudinally organized fins 42 as shown in FIG. 1, helically organized fins 43 as shown in FIG. 2, studs 44 as shown in FIG. 3 or any other commercially available system of like kind. As shown in FIG. 1 the longitudinal fins 42 extend from the sleeve 13 outwardly into the convection input passage 21 to provide a large metal surface area in heat exchange relationship with the hot gas 34 so as to take heat therefrom. The longitudinally organized fins 42 also extend inwardly from the sleeve 13 into the convection output passage 36 so as to conduct heat to the process stream 33 without need for passing the process stream 33 through tubes (at a consequent pressure loss penalty). Heat transfer to the sleeve 13 via the disk like partition section 26 and the duct 27 at the second end 17 is substantially by means of radiant heat transfer. The same principles are involved in the embodiments of FIGS. 2 and 3 with the only differences being that the extended surfaces used therein are the helically organized fins 42 and studs 44 respectively.

If desired the outer flow space 15 may be operated at superatmospheric pressure to reduce pressure differential between the inner 14 and the outer 15 flow spaces, thereby reducing wall thickness requirements of the sleeve 13.

It will be understood by those familiar with heater design that various deviations may be made from the described preferred embodiments, without departing from a main theme of invention set forth in a claim which follows.

I claim:

1. An air heater for a large flow of air to be heated at a low pressure loss, the heater comprising in combination: a cylindrical shell having a first end and a second end, a cylindrical sleeve mounted coaxially in the shell and having a first end and a second end each corresponding with that of the shell, the sleeve connected expandably by means of a bellows to the shell at one each of the shell and connected fixedly to the shell at the other end of the shell, the bellows positioned about the sleeve outwardly of the sleeve, the first ends of the shell and the sleeve converging to form a convection input passage therebetween, convection-input extended surface projecting from the sleeve into the convection input passage, the second ends of the shell and the sleeve diverging to form a radiant zone therebetween, hot gas means for passing a hot gas in turn through the radiant zone and the convection input passage, the hot gas means including at least one burner connected to supplies of fuel and oxygen as well as penetrating the shell to introduce the hot gas into the radiant zone, a cylindrical baffle mounted within the sleeve in its first end and defining a convection output passage boardered inwardly by the baffle and outwardly by the sleeve, air input means for introducing the air to be heated into the sleeve with the baffle organized to channel the air to be heated to the convection output passage, air output means for withdrawing the air to be heated from the convection output passage out of the heater, convection output extended surface projecting from the sleeve into the convection output passage.

* * * * *